United States Patent [19]
Uetake et al.

[11] Patent Number: 6,034,458
[45] Date of Patent: Mar. 7, 2000

[54] DC BRUSHLESS MOTOR HAVING AN INTERIOR PERMANENT MAGNET ROTOR WITH OPTIMAL MAGNET THICKNESS/AIR GAP RELATIONSHIP

[75] Inventors: Akihito Uetake; Yoshihiko Yamagishi, both of Suwa, Japan

[73] Assignee: Seiko Epson Corporation, Tokyo, Japan

[21] Appl. No.: 09/148,812

[22] Filed: Sep. 4, 1998

Related U.S. Application Data

[62] Division of application No. 08/620,633, Mar. 22, 1996, Pat. No. 5,844,344.

[30] Foreign Application Priority Data

Mar. 24, 1995 [JP] Japan ................................ 7-66577
Jan. 10, 1996 [JP] Japan ................................ 8-2691

[51] Int. Cl.⁷ .................................................. H02K 1/27
[52] U.S. Cl. .................................................. 310/156
[58] Field of Search ............................ 310/156; 335/284

[56] References Cited

U.S. PATENT DOCUMENTS

| | | | |
|---|---|---|---|
| 4,649,331 | 3/1987 | Jahns ................................ | 318/798 |
| 4,939,398 | 7/1990 | Lloyd ................................ | 310/156 |
| 4,954,736 | 9/1990 | Kawamoto et al. .................. | 310/156 |
| 4,973,871 | 11/1990 | Bisantz ................................ | 310/154 |
| 5,006,745 | 4/1991 | Nishio et al. ......................... | 310/177 |
| 5,041,749 | 8/1991 | Gaser et al. ......................... | 310/156 |
| 5,083,054 | 1/1992 | Tomite et al. ........................ | 310/154 |
| 5,095,238 | 3/1992 | Suzuki et al. ........................ | 310/156 |
| 5,424,902 | 6/1995 | Shida et al. ......................... | 361/148 |
| 5,508,576 | 4/1996 | Nagate et al. ........................ | 310/156 |

FOREIGN PATENT DOCUMENTS

3/117350  5/1991  Japan ................................ 310/156

*Primary Examiner*—Elvin Enad
*Assistant Examiner*—K. Tamai
*Attorney, Agent, or Firm*—Mark P. Watson

[57] ABSTRACT

A DC brushless motor 3 is provided which comprises armature 31 and rotor 32. Rotor 32 is provided with a rotor yoke that has four main poles 321 on its periphery. Slots with a radial-direction size of $L_m$ are formed on main poles 321 of the rotor yoke. Magnetic-field permanent magnet 323 with an approximate thickness of $L_m$ is embedded in each slot 322, such that the radial-direction size $L_m$ of slot 322 and the air gap length $L_g$ of the air gap formed between rotor 32 and armature 31 satisfy the relationship $0 < L_m + L_g \leq 2$ mm.

9 Claims, 8 Drawing Sheets

ROTOR B

ROTOR A

FIG._12

ROTOR B

FIG._13

ROTOR C

FIG._16 ROTATIONAL POSITION (DEG. MECH.)

DC BRUSHLESS MOTOR HAVING AN INTERIOR PERMANENT MAGNET ROTOR WITH OPTIMAL MAGNET THICKNESS/AIR GAP RELATIONSHIP

CROSS-REFERENCE TO RELATED APPLICATIONS

This application is a divisional of U.S. patent application Ser. No. 08/620,633, filed Mar. 22, 1996; now U.S. Pat. No. 5,844,344, which is incorporated herein by reference in its entirety.

BACKGROUND OF THE INVENTION

1. Field of the Invention

The present invention relates to a DC brushless motor, and in particular to a DC brushless motor having a magnetic-field permanent magnet and to a control apparatus.

2. Description of the Related Art

Two types of DC brushless motors exist and are classified in terms of their rotor structures. The first type is the surface permanent magnet (SPM) in which a magnetic-field permanent magnet is mounted on the surface of the rotor yoke. The second type is the interior permanent magnet (IPM) in which a magnetic-field permanent magnet is embedded inside the rotor yoke.

Of these two types of DC brushless motors with different rotor structures, the surface permanent magnet (SPM) rotor type usually has a structure in which a stainless steel pipe is mounted in order to prevent damage to the magnetic-field permanent magnet by the centrifugal force from the high-speed operation of the motor. As a result of this structure, the surface permanent magnet (SPM) rotor type tends to exhibit an increase in the magnetic resistance of the magnetic circuit that is composed of a magnetic-field permanent magnet, a rotor yoke, and an armature. Moreover, because the motor is driven using a power supply that is chopped having frequency of in the range of a few kHz to 20 kHz, the flow of eddy currents in the motor tends to degrade the efficiency of the motor.

On the other hand, for the embedded rotor type, a slot into which a magnetic-field permanent magnet is inserted is pre-formed in the interior of the rotor yoke when the rotor yoke is stamped out during manufacture thereof. This eliminates the need for a stainless steel pipe, and thus substantially reduces the generation of eddy currents.

Depending on the configuration of the slot, an increase in leaked magnetic flux results, thus reducing the effective number of magnetic fluxes in the magnetic circuit and the effectiveness of the magnet. Therefore, it is necessary to provide measures to prevent these conditions.

Because of these structural differences, the two types of rotors differ significantly in their machine constants, resulting in substantially different motor output characteristics. It should be noted that, because the magnetic permeability of a permanent magnet is close to that of vacuum, the magnetic permeability of some parts of a permanent magnet is considered to be equivalent to that of air.

In the motor having the surface permanent magnet (SPM) type rotor structure, the d-axis inductance is equal to the q-axis inductance and the motor has linear structure of current and torque.

Because of their favorable acceleration and deceleration characteristics as well as torque and related control characteristics, these motor are widely used as servo motors.

Motors with the interior permanent magnet (IPM) rotor structure have the characteristic of the q-axis inductance being greater than the d-axis inductance (the counter salient pole property). This permits a maximum torque control using the reluctance torque in addition to the permanent magnet's active torque, thus producing high output and high efficiency characteristics.

Moreover, motors with the interior permanent magnet (IPM) rotor structure allow the regulation of the phases of the armature current with respect to the phases of the back electromotive force (b-emf). This enables the motors with the interior permanent magnet (IPM) rotor structure to run in an rpm range greater than the limits imposed by the DC link voltage of the inverter control apparatus and the back electromotive force (b-emf) of the motor. Therefore, motors with the interior permanent magnet (IPM) rotor structure are potentially highly applicable as motors that drive mobile units, for which compact size, high efficiency, and high operating range are some of the critical performance requirements.

Regions of motor operation can be divided into two classes: one in which the motor can be operated continuously, and one in which it can be operated only for a short time. These regions are based on the extent of rise in motor temperature. Without providing a detailed description of these regions, it suffices to say that they are called continuous rating and short-time rating, respectively. The current that can be supplied for a continuous-rating operation is called the continuous-rating current.

Figure 20:
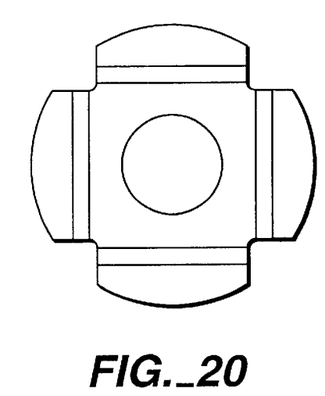
FIG. 20 is a planar diagram that shows the interior permanent magnet (IPM) rotor for a conventional DC brushless motor.
Figure 21:
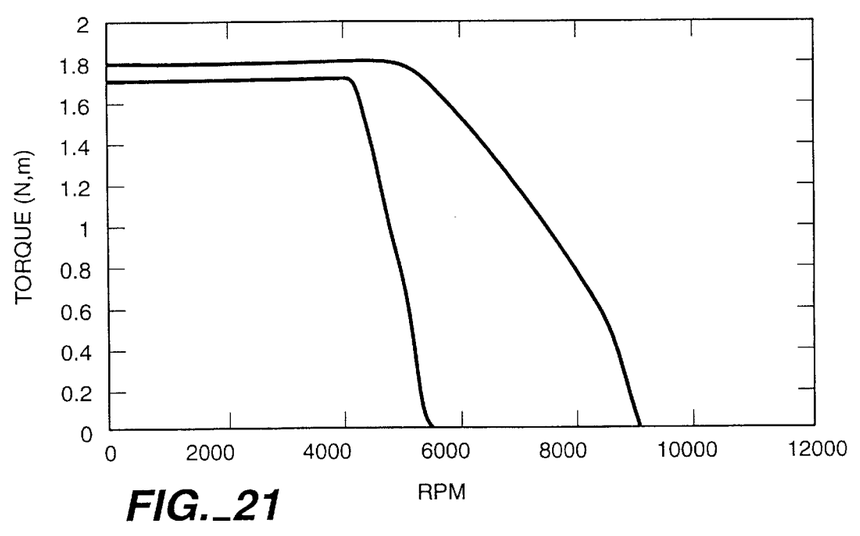
FIG. 21 is a graph that shows the output characteristics of a conventional DC brushless motor.

FIG. 20 shows the structure of a conventional interior permanent magnet (IPM) rotor. FIG. 21 shows the output characteristic that results when a conventional interior permanent magnet (IPM) rotor structure motor is operated using a continuous-rating current.

As shown in FIG. 21, the ratio for a conventional motor is 1.6 (9200/5600 rpm) between the maximum rpm that is achieved when the motor is operated so that its back electromotive force (b-emf) and armature current are in phase with each other (called "$i_d=0$" control) and the rpm that is achieved when the motor is operated using field-weakening control.

Thus, field-weakening control permits a 1.6-fold increase in the range of rpm over which the motor can be operated continuously. Although not shown in the figure, this range can be further increased by supplying a current greater than the continuous-rating current to the armature.

It is possible to produce a compact, high-efficiency, wide-operating range motor by controlling a motor with a conventional interior permanent magnet (IPM) rotor using conventional techniques.

In a DC brushless motor with a conventional interior permanent magnet (IPM) rotor, however, the maximum increase in operating range that can be achieved using a continuous-rating current is limited to approximately 1.6-fold. Any further increase in operating range entails an increase in the armature current which precludes continuous operation. This can be a problem, for example, when the mobile unit that incorporates the motor needs to cruise at high speeds.

Battery-operated motors that drive mobile units such as electric cars and electric motor scooters must be compact and highly efficient and have a wide operating range. These requirements are germane to the control apparatus and the transmission mechanism as well as to the motor itself.

However, further increases in the operating speed range of a mobile unit using a conventional motor, within the range of continuous rating, require a multistage transmission device which makes the equipment bulkier.

Further, increasing the operating range for the motor itself requires a large armature current. An attendant increase in copper loss increases the heat dissipation, thus reducing the length of operable time for the motor. Conventionally, this requires devices to improve the cooling efficiency for the motor, thus resulting in an increase in motor size. On the control apparatus side, the current rating for the inverter switch device must be increased, and this also tends to increase the size of the control apparatus.

OBJECTS OF THE INVENTION

Therefore, it is an object of the present invention to overcome the aforementioned problems.

It is another object of the present invention to provide a DC brushless motor and its control apparatus with a large operating range at a continuous-rating current.

It is a further object of the present invention to provide an efficient DC brushless motor and control apparatus.

SUMMARY OF THE INVENTION

These objects and other aspects of the present invention, as stated above, can be achieved by the various embodiments of the present invention.

In accordance with a first aspect of the present invention, a DC brushless motor having a rotor is equipped with a rotor yoke having two or more main poles in its periphery and an armature characterized in that a slot with a radial-direction size of $L_m$ is formed on the main pole and a magnetic-field permanent magnet with an approximate thickness of $L_m$ is inserted into the slot, such that if the air gap length of the air gap formed between the rotor and the armature is $L_g$, the DC brushless motor is set so that the relationship $0 < L_m + L_g \leq 2$ mm is satisfied.

In accordance with a second aspect of the present invention, a DC brushless motor having a rotor is equipped with a rotor yoke having two or more main poles in its periphery and an armature slot with a radial-direction size of $L_m$ is formed on the main pole and a magnetic-field permanent magnet with an approximate thickness of $L_m$ is inserted into the slot, such that if the air gap length of the air gap formed between the rotor and the armature is $L_g$, the DC brushless motor is set so that the relationship $0.3 \text{ mm} \leq L_m + L_g \leq 2$ mm is satisfied.

In accordance with a third aspect of the present invention, a DC brushless motor having a rotor is equipped with a rotor yoke having two or more main poles in its periphery and an armature a slot with a radial-direction size of $L_m$ is formed on the main pole and a magnetic-field permanent magnet with an approximate thickness of $L_m$ is inserted into the slot, such that if the air gap length of the air gap formed between the rotor and the armature is Lg, the DC brushless motor is set so that the relationship $0.3 \text{ mm} \leq Lm + L_g \leq 1.3$ mm is satisfied.

In accordance with a fourth aspect of the present invention, the DC brushless motor is set so that, if D denotes the maximum outer radius of the rotor, the DC brushless motor is set so that the relationship $0 < L_m + L_g \leq 2D/51$ is satisfied.

In accordance with a fifth aspect of the present invention, a DC brushless motor having a rotor is equipped with a rotor yoke having two or more main poles in its periphery and an armature. A slot with a radial-direction size of $L_m$ is formed on the main pole and a magnetic-field permanent magnet with an approximate thickness of $L_m$ is inserted into the slot, such that if the air gap length of the air gap formed between the rotor and the armature is $L_g$ and the maximum outer radius of the rotor is D, the DC brushless motor is set so that the relationship $0 < L_m + L_g \leq 2D/51$ is satisfied.

In accordance with a sixth aspect of the present invention, a magnetic-field permanent magnet is polarized after it is inserted into the main pole.

In accordance with a seventh aspect of the present invention, the DC brushless motor comprises an armature coil in the armature as a polarization coil for the magnetic-field permanent magnet.

In accordance with an eighth aspect of the present invention, an auxiliary salient pole, made by extruding a part of the rotor yoke, is formed between adjacent main poles on the rotor yoke, and in which an air gap of a specified length is formed between the auxiliary salient pole and the armature.

In accordance with a ninth aspect of the present invention, a DC brushless motor has a rotor with a rotor yoke having two or more main poles in its periphery and an armature. A slot is formed in the main pole and a magnetic-field permanent magnet is inserted into the slot; such that an auxiliary salient pole, made by extruding a part of the rotor yoke, is formed between adjacent main poles on the rotor yoke, and an air gap of a specified length is formed between the auxiliary salient pole and the armature.

In accordance with a tenth aspect of the present invention, the auxiliary salient pole protrudes radially from the center of the rotary axis of said rotor yoke.

In accordance with an eleventh aspect of the present invention, the auxiliary salient pole contains a part whose cross section gradually increases toward the tip of the auxiliary salient pole.

In accordance with a twelfth aspect of the present invention, the tip of the auxiliary salient pole is formed separately and independently from the main pole.

In accordance with a thirteenth aspect of the present invention, the length from the center of the rotary axis of the rotor yoke to the tip of the auxiliary salient pole is no greater than the length from the center of the rotary axis of the rotor yoke to the tip of the main pole.

In accordance with a fourteenth aspect of the present invention, the length from the center of the rotary axis of the rotor yoke to the tip of the auxiliary salient pole is greater than the length from the center of the rotary axis of said rotor yoke to the tip of said main pole, and is less than the length from the center of the rotary axis of the rotor yoke to the tip of the main pole plus said air gap length $L_g$.

In accordance with a fifteenth aspect of the present invention, if $\theta_2$ denotes the coil slot width angle of said armature yoke, $\theta_1$ denotes the slot tooth angle of the armature yoke, and $\gamma$ denotes the angle from the tip of the main pole of the rotor to the tip of the auxiliary salient pole, the relationship $\gamma > \theta_{+1}\theta_2$ is satisfied.

In accordance with a sixteenth aspect of the present invention, if $\theta_2$ denotes the coil slot width angle of the armature yoke, $\theta_1$ denotes the slot tooth angle of the armature yoke, and $\gamma$ denotes the angle from this tip of the main pole of the rotor to the tip of the auxiliary salient pole, the relationship $\gamma = \theta_1 + 2\theta_2$ is satisfied.

In accordance with a seventeenth aspect of the present invention, a control apparatus is provided with a rotor position detection means that detects the rotor position of the DC brushless motor and a current detection means that detects the armature current of the DC brushless motor. An inverter controller controls the armature current so that the d-axis current does not exceed $I_{mr}$ if the maximum armature current that allows the continuous operation of the DC brushless motor is $I_{mr}$.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

DESCRIPTION OF THE PREFERRED EMBODIMENTS

The following is a detailed explanation of the DC brushless motor and the control apparatus of the present invention with reference to the preferred embodiments that are shown in attached drawings.

First Embodiment

Figure 1:
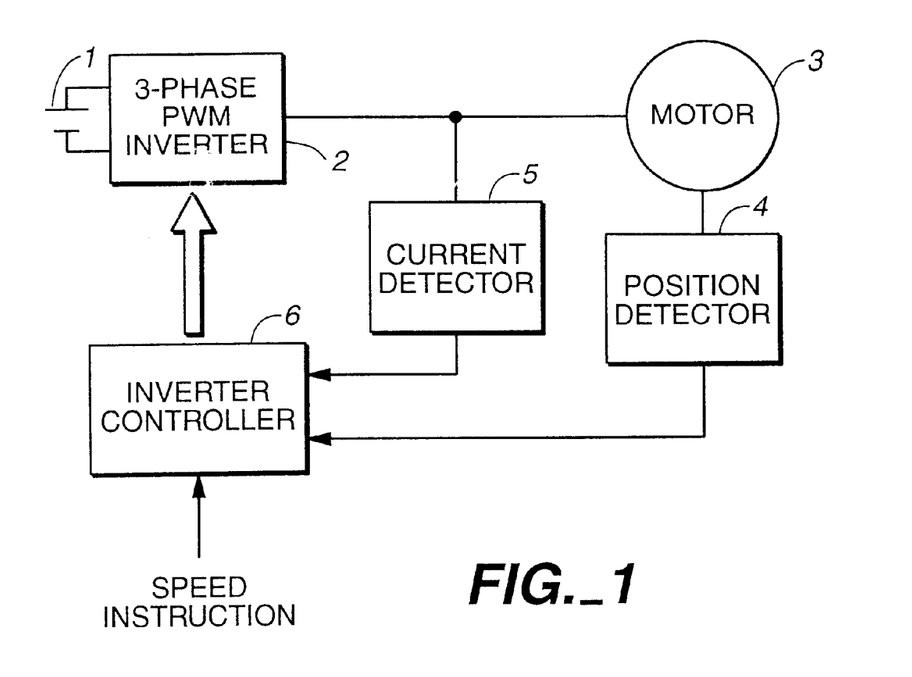
FIG. 1 is a block diagram that shows a configuration of an example of a DC brushless motor and a control apparatus of the present invention.

FIG. 1 is a block diagram showing a configuration example of the DC brushless motor and the control apparatus of the present invention. As shown in the figure, the control apparatus of the present invention is a motor control apparatus that controls the operation of DC brushless motor (motor) 3. The control apparatus is provided with rotor position detection means 4 that detects the rotor position of DC brushless motor 3, current detection means 5 that detects the armature current of DC brushless motor 3, 3-phase pulse wave modulation or PWM inverter 2 (inverter), and inverter controller 6 that controls the actions of the 3-phase PWM inverter 2.

In the control apparatus, a specified DC voltage is supplied (applied) to 3-phase PWM inverter 2 from DC power supply 1. The 3-phase PWM inverter 2 generates 3-phase AC voltage. The 3-phase PWM inverter 2 energizes the armature coil (3-phase armature coil) of DC brushless motor 3 in a specified pattern.

In this case, the rotor position signal that is detected and generated by rotor position detection means 4, the current signal (detected signal) that is detected and generated by current detection means 5, and a speed instruction are each input into inverter controller 6. Based on the rotor position signal, the current signal, and the speed instruction, inverter controller 6 controls the action of 3-phase PWM inverter 2 and operates (drives) DC brushless motor 3.

Figure 2:
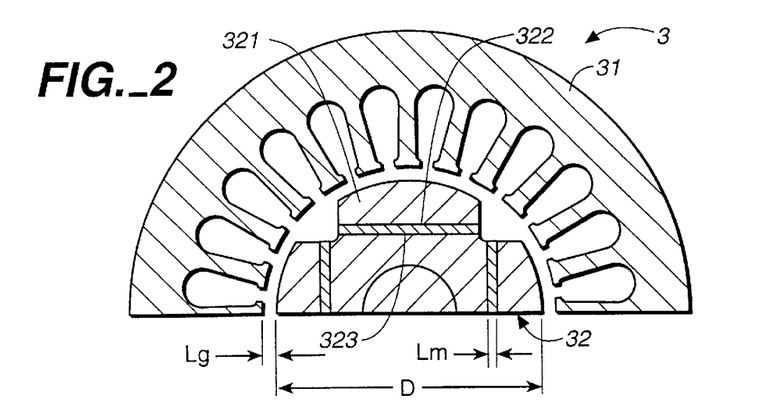
FIG. 2 is a critical-part cross-sectional view diagram that shows a configuration of an example of the DC brushless motor of the first embodiment of the present invention.

FIG. 2 is a critical-part cross-sectional view that shows a configuration example of the DC brushless motor of the present invention. As shown in the figure, DC brushless motor 3 of the present invention comprises armature 31 and rotor 32, which is supported on a rotary axis (not shown in the figure). An air gap is provided between armature 31 and rotor 32 so that rotor 32 can rotate by maintaining a fixed air gap length $L_g$.

Armature 31 has an armature yoke (armature iron core) composed of laminated steel plates (metal plates). The armature yoke is provided with a 3-phase armature coil which is not shown in the figure.

Rotor 32 is provided with a rotor yoke that has two or more main poles 321 (four main poles in the first embodiment) on its periphery. The rotor yoke is composed of laminated steel plates (metal plates).

A slot 322 with a radial size (the length in a radial direction) of $L_m$ is formed on each main pole 321 for the rotor yoke. On each slot 322, a magnetic-field permanent magnet (magnet) with an approximate thickness (the length in a radial direction) of $L_m$ (approximately equal to the radial size $L_m$ of slot 322) is embedded.

Although there are no particular restrictions on the type (e.g., composition) of magnetic-field permanent magnet 323 that is inserted into slot 322, it is desirable to use a magnet with excellent magnetic properties, such as a rare-earth magnet with a basic composition of rare-earth elements, transition metals, and boron.

In this case, the desirable magnetic properties of the magnet that is used as a preferred embodiment include: an energy product, (BH)max, at 20° C. of 20–50 MGOe; a saturation magnetic flux density, Br, of 9.0–14.0 kG, and a coercive force, iHc, of 15–25 kOe.

There are several ways to fix magnetic-field permanent magnet 323 to slot 322. The technique employed in this embodiment involves setting the size of magnetic-field permanent magnet 323 to a size slightly less than that of slot 322, inserting magnetic-field permanent magnet 323 into slot 322, and then covering both edge surfaces in the axial direction of the rotor yoke with a non-magnetic plate. Other techniques include, for example: pressure-inserting magnetic-field permanent magnet 323 into slot 322; and bonding magnetic-field permanent magnet 323 to slot 322. For each technique, the sizes of slot 322 and magnetic-field permanent magnet 323 should be set.

The size of such a DC brushless motor is set so as to increase the reaction of the armature. Specifically, the size of the DC brushless motor is set so that radial-direction size Lm of slot 322 and air gap length Lg satisfy the relationship $0 < L_m + L_g \leq 2$ mm, preferably $0 < L_m + L_g \leq 1.3$ mm.

The relationship $L_m + L_g > 2$ mm results in a limited speed gain ratio and a narrow operating range, as will be discussed later.

A more detailed explanation follows. In the d-q coordinate system, the voltage/current equation for the DC brushless motor can be given by the following formula:

$$\begin{bmatrix} V_d \\ V_q \end{bmatrix} = r \begin{bmatrix} -i_d \\ i_q \end{bmatrix} + \omega \begin{bmatrix} 0 & L_q \\ -L_d & 0 \end{bmatrix} \begin{bmatrix} i_d \\ i_q \end{bmatrix} + \omega \begin{bmatrix} 0 \\ \phi_{mag} \end{bmatrix} \quad \text{Equation 1}$$

where $\omega$ denotes the rotational angular velocity, r the armature coil resistance, $\phi_{mag}$ the effective magnetic flux count, $V_d$ the d-axis component of the motor terminal voltage (the d-axis voltage), $V_q$ the q-axis component of the motor terminal voltage (the q-axis voltage), $i_d$ the d-axis component of the armature current (the d-axis current), $i_q$ the q-axis component of the armature current (the q-axis current), $L_d$ the d-axis component of the armature inductance (the d-axis inductance), and $L_q$ the d-axis component of the armature inductance (the q-axis inductance).

Motor terminal voltage $V_m$ and the maximum voltage that can be applied to DC brushless motor 3, i.e., link voltage V of 3-phase PWM inverter 2, are related by the equation given below. The motor's high-speed rotation is possible within the range in which this relationship is satisfied.

Equation 2

$$V \geq V_m$$

The equation can be simplified by substituting Equation 1 into Equation 2. For high-speed rotation, the influence of voltage decline on armature coil resistance r can be ignored. Taking cognizance of this fact, the equation can be modified as follows:

$$V \geq V_m = \sqrt{V_d^2 + V_q^2} = \sqrt{(\omega L_q i_q)^2 + (-\omega L_d i_d + \omega \phi_{mag})^2} \quad \text{Equation 3}$$

This equation indicates, for example, that under $i_d=0$ control when the rotational speed increases and the equality $V=V_m$ is reached, the speed cannot be increased beyond that point, but that by supplying the current $i_d$ the term $V_q$ can be made small so that the rotational speed can be increased further.

Let us now consider the d-axis current in order to achieve further increases in the rotational speed. If the d-axis current necessary to cancel completely the magnetic flux of magnetic-field permanent magnet 323 is $i_{d0}$, then $i_{d0}$ can be expressed as follows:

$$i_{do} = \frac{\phi_{mag}}{L_d} \quad \text{Equation 4}$$

Equation 4 indicates that, for a constant $\phi_{mag}$, the greater the value of $L_d$, the smaller is the value of $i_{d0}$, and consequently smaller is the value of $i_d$ that is necessary for field-weakening for a motor in which the armature reaction is great.

Figure 3:
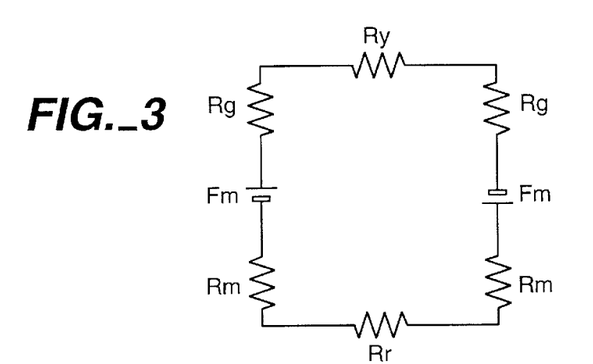
FIG. 3 is an equivalent circuit diagram that shows a simplified magnetic circuit of the DC brushless motor of FIG. 1.

FIG. 3 is a circuit diagram that shows a simplified magnetic circuit configuration for the DC brushless motor. In FIG. 3, $F_m$ denotes the electromotive force of magnetic-field permanent magnet 323, $R_g$ the magnetic resistance of the air gap, $R_m$ the magnetic resistance of the slot into which magnetic-field permanent magnet 323 of rotor 32 is inserted, $R_r$ the magnetic resistance of the rotor yoke, and $R_y$ the magnetic resistance of the armature yoke.

Normally, these magnetic resistances are related by the inequality $R_m > R_g >> R_y$, $R_r$. The strength of the armature reaction can be considered to be in proportion to the reciprocal of the sum of the magnetic resistances of the magnetic circuits. Therefore, a magnetic circuit with small values of $R_m$ and $R_g$ would lead to a motor with a large value of Ld, namely, a small value of $i_d$ that is necessary for achieving a weak field.

The following describes the results of a study that was conducted based on the above theoretical underpinnings. Table 1 below shows the dimensions of magnetic circuits and the specifications for the motors for two DC brushless motors for first and second examples of the first embodiment of the present invention and a conventional DC brushless motor.

TABLE 1

| Parameter | | First Example | Second Example | Conventional |
|---|---|---|---|---|
| Lg | [mm] | 0.3 | 0.3 | 0.5 |
| Lm | [mm] | 1.0 | 1.7 | 2.7 |
| Ld | [mH] | 4.76 | 3.42 | 2.87 |
| Lq | [mH] | 6.27 | 6.63 | 5.61 |
| φmag | [wb] | 0.077 | 0.087 | 0.088 |
| ido | [A] | 16.2 | 25.4 | 30.7 |
| Imr | [A] | 8.0 | 8.0 | 8.0 |

As shown in Table 1, whereas in the conventional example $i_{d0}$ is 3.8 times the motor's continuous-rating current $I_{mr}$, for the motor in the present embodiment $i_{d0}$ is 2 to 3.2 times the motor's continuous-rating current $I_{mr}$, thus proving that the continuous-rating current is more strongly influenced by the armature reaction.

Figure 4:
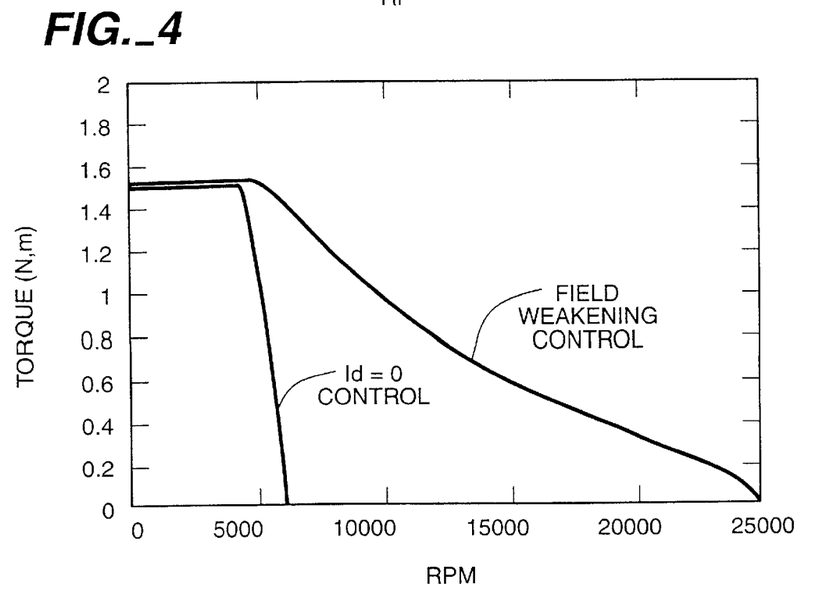
FIG. 4 is a graph that shows the output characteristics of a DC brushless motor of a first example of the first embodiment of the present invention.
Figure 5:
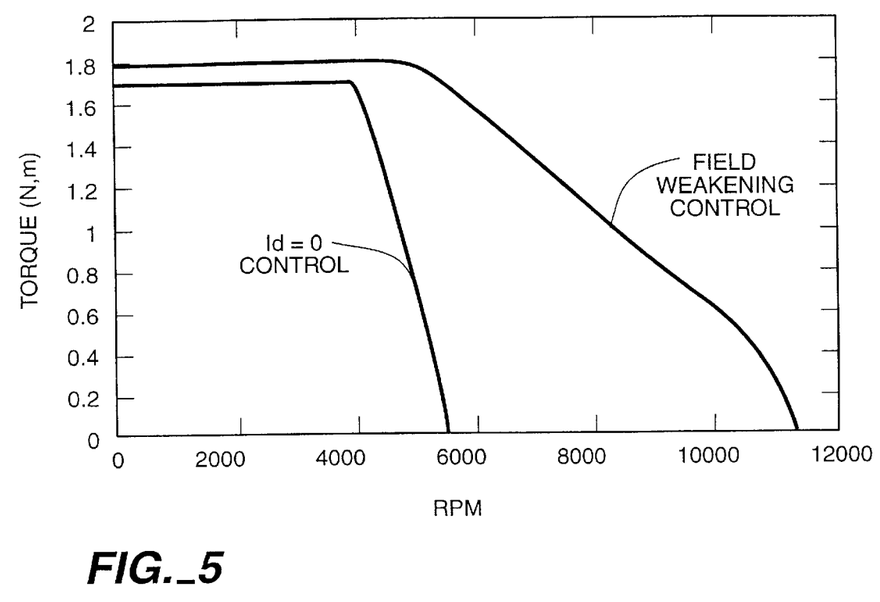
FIG. 5 is a graph that shows the output characteristics of a DC brushless motor of a second example of the first embodiment of the present invention.

FIG. 4 is a graph that shows the output characteristics of the first example of the first embodiment, and FIG. 5 is a graph that shows the output characteristics of the second of the first embodiment.

As indicated in these graphs, when compared to the maximum rotational speed that is attained under $i_d=0$ control, the maximum rotational speed (speed increase ratio) that is attained when the motor is field-weakening controlled at the motor's continuous rating, current value $I_{mr}$ has a ratio of 4 (4 times) in the first example and 2 (2 times) in the second example.

Figure 6:
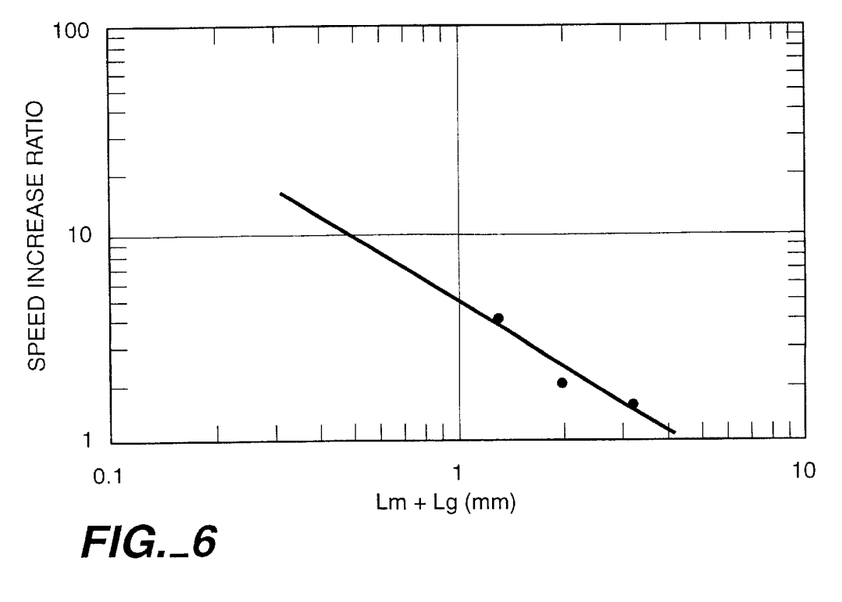
FIG. 6 is a graph that shows the relationship between $L_m+L_g$ and the speed increase ratio of the DC brushless motor in accordance with the first embodiment.

FIG. 6 is a graph that shows the relationship between $L_m + L_g$ and the speed increased ratio. As indicated in the figure, the smaller the thickness of magnetic-field permanent magnet 323 or the air gap length, the greater is the field-weakening effect at low current values, and the higher is the speed increase ratio. The lower bound for $L_m+L_g$ should be determined by considering the problem of irreversible demagnetization in permanent magnets and the ease of manufacturing.

Figure 7:
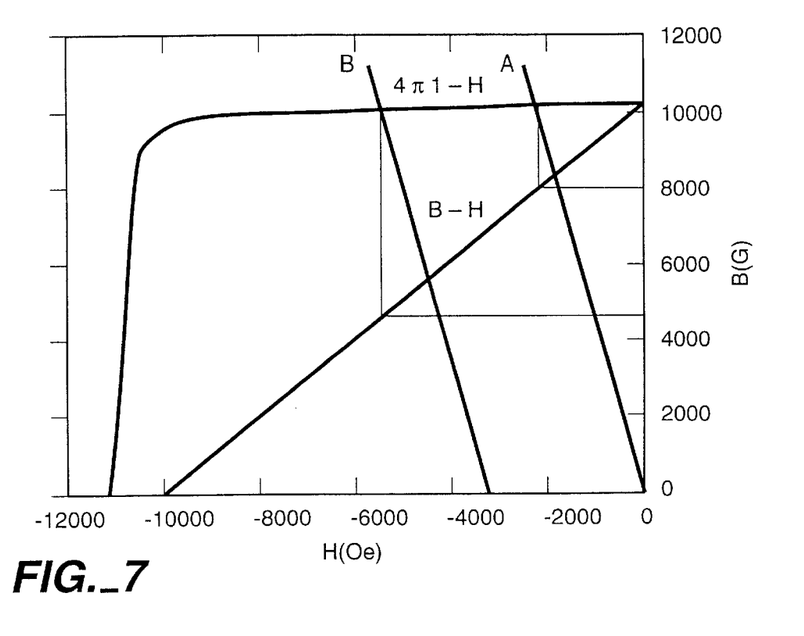
FIG. 7 is a graph that depicts the operation of the permanent magnet in accordance with the first embodiment.

The following explains demagnetization. FIG. 7 shows a graph that explains the behavior of the magnetic-field permanent magnet used in the first example. The magnet has the properties (BH)max=32 MGOe, Br=11.5 kG and iHc=21 kOe at 20° C., and a thickness of 1 mm. The curves and the straight lines shown in FIG. 7 represent, respectively, the $4\pi$ I—H and B—H magnetic hysteresis curves at 100° C., the maximum operating temperature for the motor; operation line A that is produced when no reverse magnetic fields are applied from external sources, and operation line B that is produced when a reverse magnetic field is applied by directing all of the continuous-rating current to the d-axis.

As shown in the figure, the intersection between the operation line B and the $4\pi$ I—H curve is the operating point. The operating point is to the right of the critical point. Thus, virtually no irreversible demagnetization occurs. Though not shown in the figure, irreversible demagnetization does not occur even when a current two times greater than the continuous-rating current is applied. Therefore, twice as much current can be applied to the d-axis for short periods.

Further, though not shown in the figure, the motor can be operated reliably at temperatures up to 130° C. for short periods using the continuous-rating current.

In situations in which the safety ratio relative to reliability can be lowered, the thickness of the magnet can be reduced. The margin of safety relative to irreversible demagnetization can be increased by using magnets with higher iHc values.

In FIG. 7, the rate of decrease in magnetic density can be calculated from the magnetic densities at different operating points as 0.58. This indicates an approximate twofold reduction in field-weakening.

The following is an explanation of the ease of manufacture of armature 31 and rotor 32. Air gap length $L_g$ is influenced by the manufacturing precision of armature 31 and rotor 32 as well as by the concentricity of armature 31 and rotor 32. Normally, the air gap length is set at approximately 0.35–0.7 mm by taking assembly and manufacturing variability into consideration. Under the current configuration this value can easily be reduced to approximately 0.2 mm.

The radial-direction size $L_m$ of slot 322 should be determined by taking into consideration both the mechanical strength and the demagnetization limits of the magnet.

The magnet needs to be mechanically strong enough to withstand the machining and assembly processes. However, the Nd—Fe—B sintered rare-earth magnets that were used in the investigation are relatively fragile. To offer sufficient strength, they must have an approximate thickness of 0.8 mm. The Pr—Fe—B forged and rolled rare-earth magnets that were used in the investigation have a high mechanical strength. However, to offer sufficient strength, they must have an approximate thickness of 0.1 mm.

Moreover, as shown in FIG. 7, in consideration of the demagnetization limits of magnets, the thickness of the magnets can be further reduced. Therefore, the sum of the 0.2 mm minimum air gap length $L_g$ and the 0.1 mm minimum radial-direction size $L_m$ of slot 322 can be set at a minimum of 0.3 mm. Therefore, it is desirable that the radial-direction size $L_m$ of slot 322 and the air gap $L_g$ be set so that they satisfy the relationship 0.3 mm$\leq L_m+L_g\leq$2 mm, preferably 0.3 mm$\leq L_m+L_g\leq$1.3 mm.

In the motor of the second example ($L_m+L_g$=2 mm), in which the magnet thickness is set at 1.7 mm and the air gap length at 0.3 mm, as noted above, the ratio (the speed increase ratio) between the maximum rpm attainable under $i_d$=0 control and the maximum rpm attainable under field-weakening control using a continuous-rating current is 2, thus increasing the operating rotation speed or rpm range under the continuous-rating current by a factor of 2.

Therefore, the setting that satisfies the relationship 0.3 mm$\leq L_m+L_g\leq$2 mm facilitates the manufacture of the motors and can increase the speed increase ratio to 2 or greater. This means that the operating rpm range can be increased more than twofold using the continuous-rating current.

A speed increase ratio of 2 or greater permits a change in the transmission mechanism of electric scooters from three stages to two, thus simplifying and downsizing the power transmission mechanisms such as transmissions.

Therefore, in the motor of the first example, in which the magnet thickness is set at 1 mm and the air gap length at 0.3 mm ($L_m+L_g$=1.3 mm) as noted above, the speed increase ratio is 4, thus increasing fourfold the operating rpm range at the continuous-rating current.

Therefore, the setting that satisfies the relationship 0.3 mm$\leq L_m+L_g\leq$1.3 mm facilitates the manufacture of the motors and can increase the speed increase ratio to 4 or greater. This means that the operating rpm range can be increased more than fourfold using the continuous-rating current.

A speed increase ratio of 4 or greater permits the elimination of the transmission mechanism in electric scooters and other mobile units that are designed for a relatively modest maximum speed, thus contributing to an overall downsizing of the equipment including a reduction in the size of the power transmission mechanism.

The demagnetization of magnets was previously explained with reference to FIG. 7. The following is a discussion of the demagnetization of various locations on the surface of a magnet.

Figure 8:
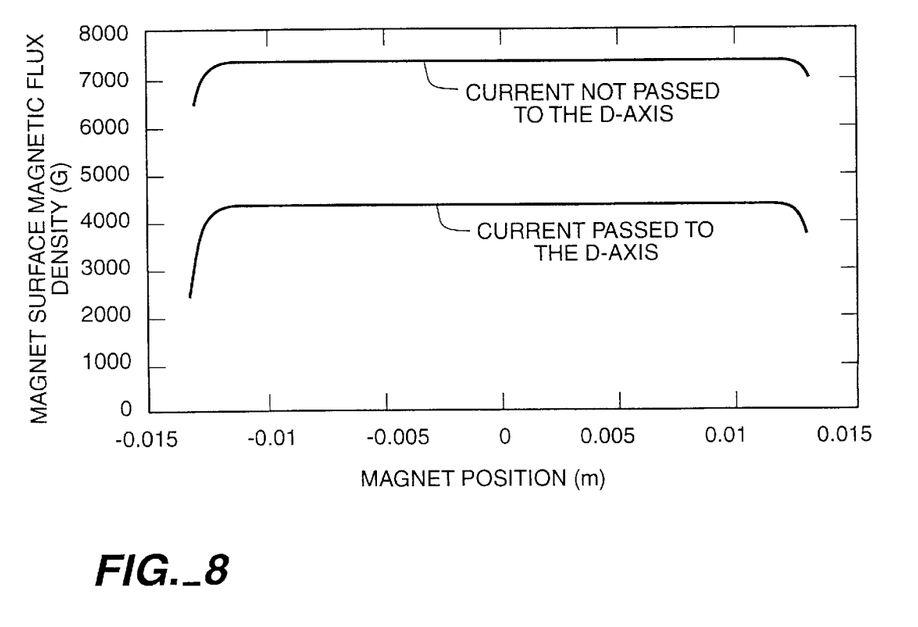
FIG. 8 is a graph that shows the relationship between the magnet surface magnetic flux density of the permanent magnet in accordance with the first embodiment and the position of the magnet in the width direction.

FIG. 8 shows an FEM analysis of the magnetic flux densities on the surface of a magnet when a current is not applied to the d-axis and when a counter magnetic field is created by applying a continuous-rating current to the d-axis. The magnetic-field permanent magnet 323 of the present invention that was used in the analysis has a rectangular cross-section in the direction of the motor axis. The horizontal axis on the graph in FIG. 8 shows locations in a direction perpendicular to the direction of magnet thickness, i.e., locations in the width direction of the magnet.

The graph clearly shows that the surface magnetic flux density at the edges in the width direction of the magnet is less than the surface magnetic flux density at the center. Although the magnet as is does not cause irreversible demagnetization which would lead to a reduced performance, it is desirable to ameliorate the effects of the demagnetization field by chamfering the edges.

The thickness of magnetic-field permanent magnet 323 of the first example is 1 mm. The permeance of a single magnet is an extremely low 0.06. Therefore, the polarization requires magnetic fields of 30 kOe or greater. As another consideration, a single magnet has a large magnetic field of the opposite polarity. Therefore, polarizing the magnetic-field permanent magnet with a single magnet and then inserting it into the magnetic circuit results in a reduced number of effective magnetic fluxes.

Therefore, it is desirable to polarize magnetic-field permanent magnet 323 after constructing a magnetic circuit by embedding the magnetic-field permanent magnet into main pole 321 of the rotor yoke. By polarizing magnetic-field permanent magnet 323 while it is being embedded in main pole 321, the permeance of magnetic-field permanent magnet 323 during polarization can be enhanced. This facilitates the polarization process, improves the efficiency of motor production, and increases the number of effective magnetic fluxes. Further, because magnetic-field permanent magnet 323 can be installed on main pole 321 before the former is polarized, the installation process is not subject to the effects of the magnetic attraction. This offers the advantage of an improved motor production efficiency.

In this case, the placement of a polarization yoke on the periphery of rotor 32 and the maintenance of an approximate air gap length of 0.1 mm results in an increase in permeance to 6 or higher, thus permitting polarization using a magnetic field as low as 20 kOe.

Moreover, it is desirable to use the armature coil for armature 31 as a polarization coil for magnetic-field permanent magnet 323, namely, to use armature 31 as a polarization yoke. Using armature 31 as a polarization yoke results in a permeance of 3.4. In this case, as in the situation in which a dedicated polarization yoke is employed, it is possible to effect polarization using a magnetic field as low as 20 kOe. In this case, the use of a dedicated polarization yoke can be omitted.

To increase the output from the DC brushless motor, it is necessary to enlarge the motor's outer diameter, increase the space in which the armature coil is wound, enlarge the maximum outer diameter (maximum diameter) D of rotor 32 (FIG. 2), and increase the amount of magnets so as to increase the effective number of magnetic fluxes. Simultaneously, it is necessary to increase the thickness of the magnet and set the permeance high in order to prevent demagnetization due to an increase in armature electromotive force.

On the other hand, to reduce the DC brushless motor's output (when a low output is acceptable), both the maximum outer diameter D of rotor 32 and the thickness of the magnet are reduced, in opposition to the description given above.

Thus, the maximum outer diameter D of rotor 32 and the thickness of the magnet (radial-direction size $L_m$ of slot 322)+air gap length $L_g$, in particular the maximum outer diameter D of rotor 32 and the thickness of the magnet, are positively correlated.

Accordingly, the radial-direction size $L_m$ of slot 322, the air gap length $L_g$, and the maximum outer diameter D of rotor 32 (the relationship between $L_m+L_g$ and D) should be set so that they satisfy Equation (5) below, preferably Equation (6) below:

$$0 < L_m + L_g \leq 2 \times D/51 \quad (5)$$

$$0 < L_m + L_g \leq 1.3 \times D/51 \quad (6)$$

The relationship $L_m+L_g > 2 \times D/51$ results in a low speed increase ratio and a reduced motor operating range.

For manufacturing reasons as noted above, the lower bound on $L_m+L_g$ should be approximately 0.3 mm. Thus, preferably the relationship between $L_m$, $L_g$, and D should be set so that they satisfy Equation (7) below, optimally Equation (8) below:

$$0.3 \text{ mm} < L_m + L_g \leq 2 \times D/51 \quad (7)$$

$$0.3 \text{ mm} < L_m + L_g \leq 1.3 \times D/51 \quad (8)$$

Figure 9:
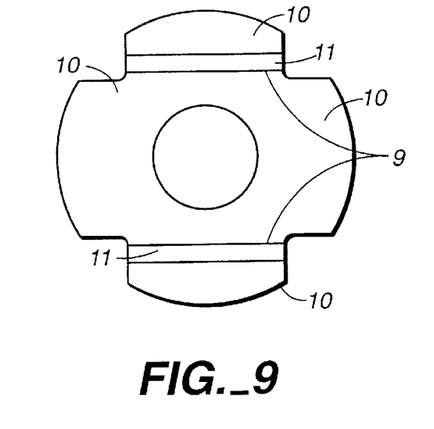
FIG. 9 is a planar diagram that shows another configuration example of the rotor of the present invention.

In the present invention, DC brushless motor 3 is not limited to the configuration shown in FIG. 2; it can be constructed such that, as shown in FIG. 9, in which slots 9 are formed at every other main pole 10 and magnetic-field permanent magnet 11 is embedded in each of the slots 9.

Thus, even in situations in which magnetic-field permanent magnets 11 are embedded in every other main pole 10, the quantity $L_m+L_g$ is set so that it satisfies a specified inequality, as in the case of the embodiment described above. In this case, however, one half the radial-direction size (the size in the direction of the thickness of the magnet) of slot 9 of the rotor yoke is defined as $L_m$.

Figure 10:
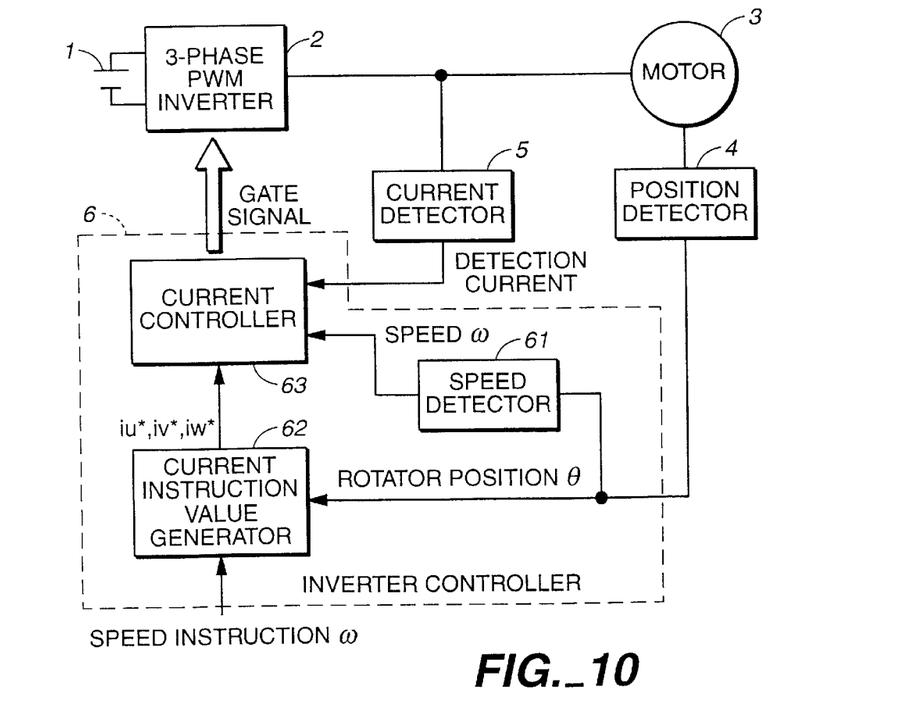
FIG. 10 is block diagram that shows a configuration of an example of a control apparatus of the first embodiment.

The following is a detailed description of the control apparatus of the present invention. FIG. 10 is a block diagram that shows a configuration example of the control apparatus of the present invention.

As shown in the figure, inverter controller 6 of the control apparatus comprises speed detection means 61, current instruction value co generator 62, and current controller 63.

Rotor position detection means 4 comprises, for example, a rotary encoder. Output signals from the rotary encoder, namely rotor position signal θ, are supplied to current instruction value generator 62 as well as to speed detection means 61, and are converted to a speed signal by speed detection means 61.

Based on a speed instruction value and rotor position signal θ, current instruction value generator 62 calculates instruction values for the current amplitude and phase of the 3-phase armature and generates 3-phase armature current values $iu^x$, $iv^x$, and $iw^x$.

Based upon the detected current from current detection means 5 and the speed signal from speed detection means 61, and with respect to 3-phase armature current instruction values $iu^x$, $iv^x$, and $iw^x$, current controller 63 corrects the current value and generates voltage instruction value (gate signals) that are applied to the switching devices (power devices) of inverter 2.

Figure 11:
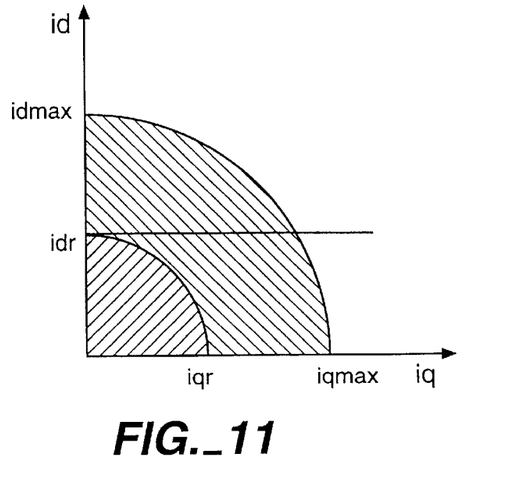
FIG. 11 is a graph that shows the current vector locus of the first embodiment.

In this case, current controller 63 corrects current values according to the current vector loci shown in FIG. 11.

For example, in FIG. 11, the current controller regulates the armature current by correcting the current value so that the motor operates in the following ranges: (1) the arc enclosed by the d-axis and q-axis components $i_{qr}$ and $i_{dr}$ of the continuous-rating current value $I_{mr}$; (2) the range enclosed by the arc $i_{qmax}$ and the straight line $i_{dr}$ (the range in which the d-axis current $i_d$ does not exceed Imr); and (3) the arc enclosed by $i_{qmax}$ and $i_{dmax}$. The aforementioned $i_{qmax}$ and $i_{dmax}$ represent the current value that produces the maximum necessary torque for the motor. Normally this is 2 to 4 times the value of $I_{mr}$. Incidentally, the motor should be operated (enabled to exceed) only for relatively short periods in ways that exceed the range indicated in (1) above (operations (2) and (3)).

In FIG. 11, a continuous operation is possible if the motor is regulated so that it runs within the arc range enclosed by the d-axis and q-axis components $i_{qr}$ and $i_{dr}$ of the continuous-rating current value $I_{mr}$. The motor output characteristics shown in FIGS. 4 and 5 trace the loci on the circle enclosed by $i_{qr}$ and $i_{dr}$ in FIG. 11.

Moreover, by regulating the motor operation so that it runs within the range enclosed by the arc $i_{qmax}$ and the straight line $i_{dr}$, it is possible to increase the output torque and protect the magnetic-field permanent magnet from an irreversible demagnetization.

Moreover, by regulating the motor operation so that it runs within the arc enclosed by $i_{qmax}$ and $i_{dmax}$, it is possible to increase the maximum rpm further and to enlarge the operating range. However, the user needs to monitor the temperature of the motor during motor operation and be careful about the irreversible demagnetization of the magnetic-field permanent magnet.

Although this embodiment uses a rotary encoder as rotor position detection means 4, in this invention there are no particular restrictions as to the type of rotor position detection means that can be used. In addition to the rotary encoder, a position sensorless control, for example, can be used as a means of detecting the rotor position.

Second Embodiment

Figure 12:
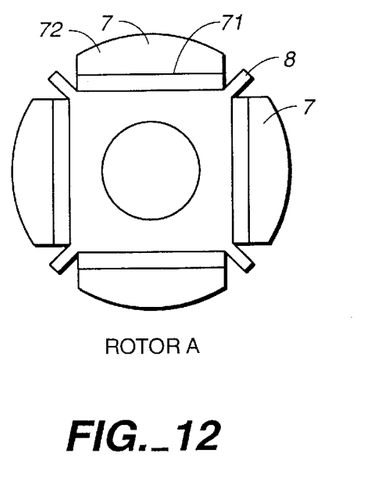
FIG. 12 is a planar diagram that shows another configuration example of the rotor of the present invention.
Figure 13:
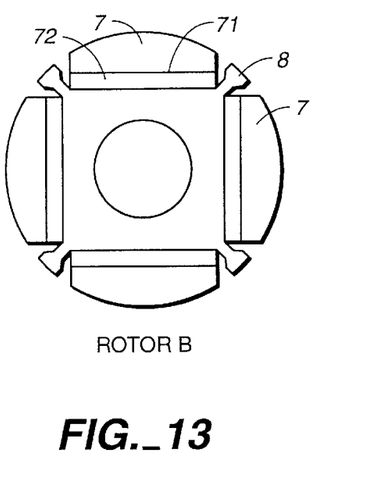
FIG. 13 is a planar diagram that shows another configuration example of the rotor of the present invention.
Figure 14:
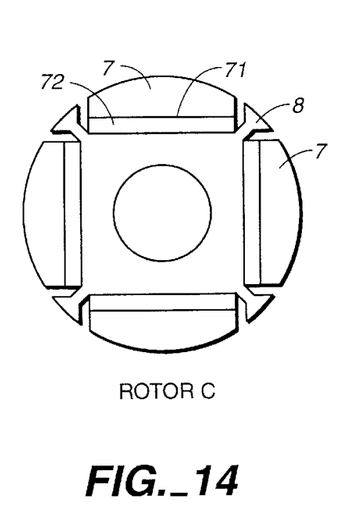
FIG. 14 is a planar diagram that shows another configuration example of the rotor of the present invention.

FIGS. 12, 13, and 14 are planar diagrams that show other configuration examples of the rotor of the DC brushless motor of the present invention. The configuration of the armature and the control apparatus for the DC brushless motor are identical to those shown in FIG. 1 described above. Therefore, an explanation of these units is omitted.

As shown in FIG. 12, the rotor for the DC brushless motor is provided with a rotor yoke that has two or more main poles 7 (four main poles in this embodiment arranged) on its periphery. The rotor yoke is composed of, for example, laminated steel plates (metal plates). Slot 71 is formed on each main pole 7 in the rotor yoke. A magnetic-field permanent magnet 72 is embedded in each slot 7.

An auxiliary salient pole 8, fabricated by extruding a part of the rotor yoke, is formed between adjacent main poles 7 on the rotor yoke. An air gap with a specified length (a fixed length) is formed between auxiliary salient pole 8 and an armature (not shown in the figure).

These auxiliary salient poles 8 protrude radially (in the radial direction) from the center of the rotary axis of the rotor yoke.

In this case there is a fixed distance of separation between the tip of auxiliary salient pole 8 and the tip of main pole 7. In other words, the tip of auxiliary salient pole 8 is formed separately and independently from main pole 7, thus minimizing any leak magnetic flux from the principal magnetic flux that may emanate from main pole 7. Further, the provision of auxiliary salient pole 8 increases the q-axis inductance.

Each auxiliary salient pole 8 has a rod-like shape with a cross-section that is more or less constant in the radial direction. The length from the center of the rotary axis of the rotor yoke to the tip of auxiliary salient pole 8 protruding radially is set so that it is approximately equal to the length from the center of the rotary axis of the rotor yoke to the tip of main pole 7. This rotor is designated rotor A.

As shown in FIG. 13, the rotor for the DC brushless motor differs from the aforementioned rotor A only in the shape of its auxiliary salient pole 8; in other respects it is virtually identical to rotor A. Auxiliary salient pole 8 contains in its tip a part whose cross section gradually increases. Thus, the tip of auxiliary salient pole 8 is broader than its base. This rotor is designated rotor B.

Now referring to FIG. 14, the rotor for the DC brushless motor differs from the aforementioned rotor B only in the shape of its auxiliary salient pole 8; in other respects it is virtually identical to rotor B. Auxiliary salient pole 8 contains in its tip a part whose cross section gradually increases. Thus, the cross section increases gradually toward the tip, and the tip of auxiliary salient pole 8 is wider than aforementioned rotor B. This rotor is designated rotor C.

The following is a detailed explanation of the second embodiment. The electric power can be determined from the aforementioned Equation 1. Instantaneous torque τ that is generated by the DC brushless motor and that can be determined as electric power/angular velocity can be expressed by the following equation:

Equation 9

$$\tau = p_p \{\Phi_{mag} i_q + (L_q - L_d) i_d i_q\}$$

The first term on the right-hand side of Equation 5 is the active torque due to magnetic-field permanent magnet 72. The second term on the right-hand side represents the reluctance torque. $P_p$ denotes a number of pole pair. The torque of the DC brushless motor in which the q-axis inductance has a larger counter salient pole than the d-axis inductance is a combination of the above two types of torques. The symbols $i_d$ and $i_q$ are defined in the next equation.

$$\begin{bmatrix} i_d \\ i_q \end{bmatrix} = \sqrt{\frac{3}{2}} I_m \begin{bmatrix} \sin\phi \\ \cos\phi \end{bmatrix}$$

Equation 10

In Equation 10, φ denotes the current phase angle from the q-axis, and $I_m$ denotes the armature current.

This embodiment increases the q-axis inductance as well as the output torque by providing auxiliary salient pole 8 between main poles, as described above, and by applying the magnetic flux due to the armature electromotive force to the interior of the rotor yoke.

Figure 15:
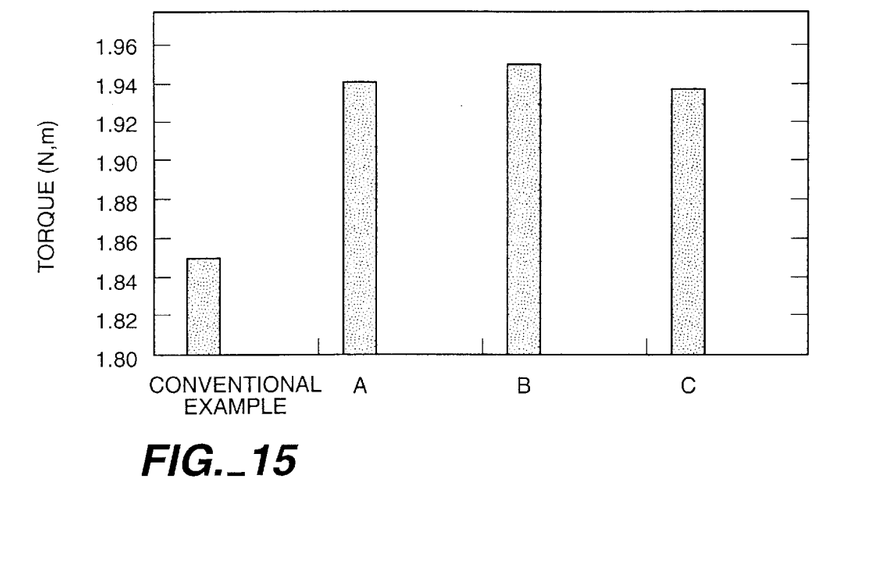
FIG. 15 is a graph that shows the torques that are generated by the DC brushless motors shown in FIGS. 12–14 and a conventional DC brushless motor.

FIG. 15 shows the average torque generated by the DC brushless motor (rotors A, B, and C) of the present embodiment as compared to the average torque in a conventional example. The average figures represent the maximum torques at the 8A armature current.

As shown in the figure, the provision of auxiliary salient pole 8 results in approximately a 5% increase in torque over the conventional example. Thus, for a given torque, the armature current can be reduced. This translates to a 1% increase in motor efficiency at 3500 rpm and a 2% increase at 1000 rpm.

Figure 16:
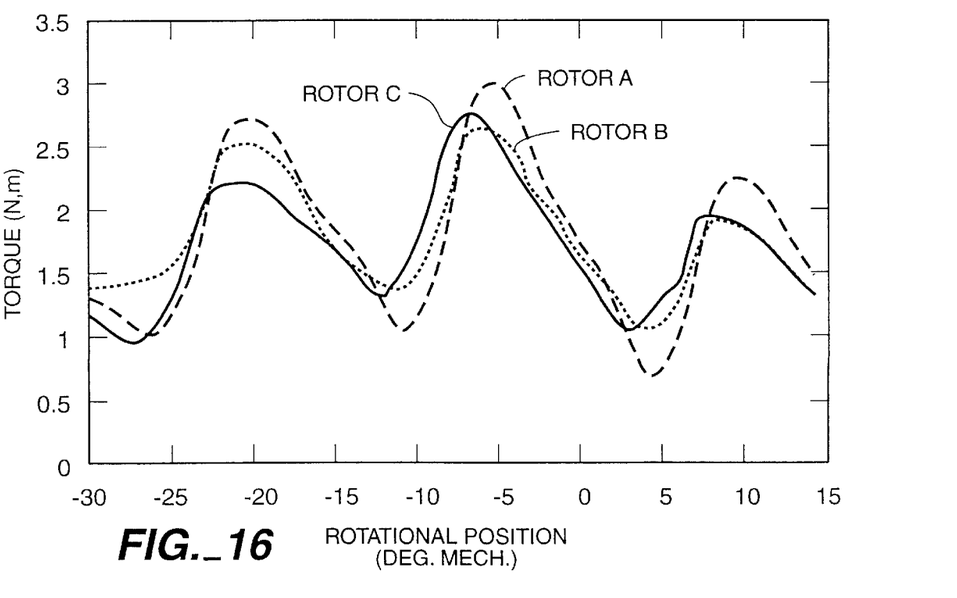
FIG. 16 is a graph that shows the instantaneous torque generated in 90-degree electric angle intervals by the DC brushless motors shown in FIGS. 12–14.

In contrast to FIG. 15 which shows average torques, FIG. 16 shows the instantaneous torque that is generated by the motors that incorporate rotors A–C shown in FIGS. 12–14, respectively.

FIG. 16 is a graph of the instantaneous torque that is generated at a 90-degree electric angle (a 45-degree mechanical angle).

As shown in the figure, the torque generated by rotor A has the greatest pulsation. The torque pulsation gradually decreases in rotor B and rotor C. Therefore, in terms of the shape of the auxiliary salient pole, rotor B is more desirable than rotor A, and rotor C more desirable than rotor B.

Figure 17:
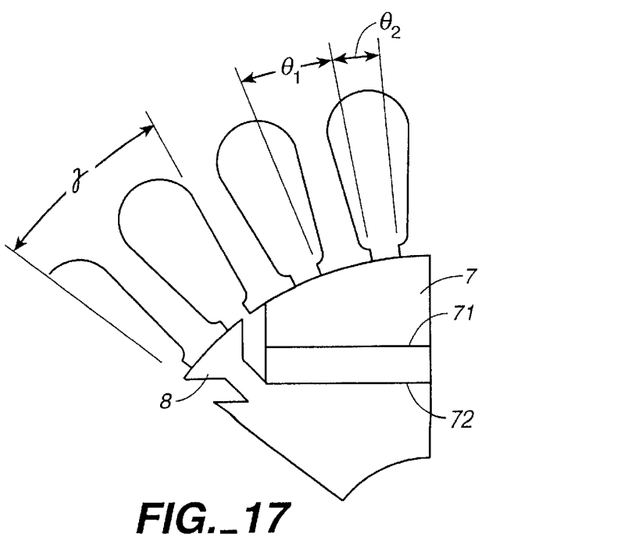
FIG. 17 is a planar diagram that shows the main poles, the auxiliary salient poles, and their vicinity in the present invention.

The following explains the geometric relationship between main pole 12 and auxiliary salient pole 8 in rotors A–C. FIG. 17 is a planar diagram that shows main pole 7, auxiliary salient pole 8, and the area around them.

As shown in the figure, if $\theta_2$ denotes the slot width angle of the coil for the armature yoke, $\theta_1$ denotes the slot tooth angle, and γ denotes the angle from the periphery direction edge (the main pole edge) of main pole 7 of the rotor to the periphery direction edge (the auxiliary salient pole edge) of auxiliary salient pole 8, the relationship $\gamma = \theta_1 + \theta_2$ holds at rotor A, $\gamma = \theta_1 + (3/2) \times \theta_2$ at rotor B, and $\gamma = \theta_1 + 2\theta_2$ at rotor C.

Figure 18:
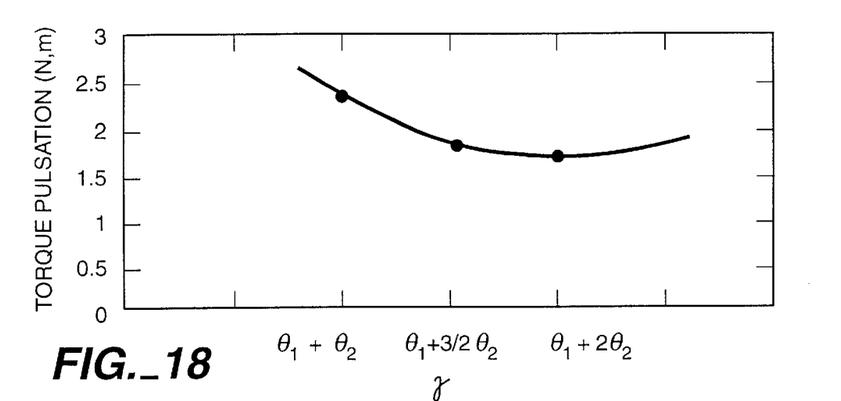
FIG. 18 is a graph that shows the relationship between the torque pulsation and the quantity γ in the present invention.

FIG. 18 shows the relationship between the torque pulsation and γ if the torque pulsation is defined as the difference between the maximum and minimum instantaneous torques.

As shown in the figure, the torque pulsation is large when $\gamma = \theta_1 + \theta_2$, i.e., when γ is equal to the angle of one pitch of the armature slot. If the value of γ is increased from $\gamma = \theta_1 + \theta_2$, the torque pulsation decreases. The value of γ can be further increased so that the torque due to auxiliary salient pole 8 in the structure of rotor C that is in the relationship $\gamma=\theta_1+2\theta_2$ can be made to have positive values only. The structure of rotor C that is in the relationship $\gamma=\theta_1+2\theta_2$ has the smallest torque pulsation.

Therefore, although the torque can be increased by providing auxiliary salient pole 8, to reduce the torque pulsation $\theta_1$, $\theta_2$, and $\gamma$ should be set so that they satisfy the relationship $\gamma>\theta_1+\theta_2$ (so that $\gamma$ is greater than the angle of one pitch of the armature slot). Preferably, they should be set so that they satisfy the relationship $\gamma\geq\theta_1+(3/2)\times\theta_2$, and optimally the relationship $\gamma=\theta_1+2\theta_2$ (so that $\gamma$ has a value in the neighborhood of $\theta_1+2\theta_2$).

Both the extent of the increase in output torque and the magnitude of torque pulsation vary with the relationship between the length from the center of the rotary axis of the rotor yoke to the tip of auxiliary salient pole 8 that protrudes radially and the length from the center of the rotary axis of the rotor yoke to the tip of main pole 7.

The length to the tip of the auxiliary salient pole 8 should be set so that it is greater than the length from the center of the rotary axis of the rotor yoke to the tip of main pole 7 and less than the length from the center of the rotary axis of the rotor yoke to the tip of main pole 7 plus air gap length $L_g$. This increases the torque due to auxiliary salient pole 8, thus resulting in an increase in output torque.

Although in this embodiment the length to the tip of said auxiliary salient pole 8 and the length from the center of the rotary axis of the rotor yoke to the tip of main pole 7 are set approximately equal, in the present invention the length to the tip of the auxiliary salient pole 8 can be less than the length from the center of the rotary axis of the rotor yoke to the tip of the main pole.

The torque pulsation can be decreased, with an attendant decrease in torque due to auxiliary salient pole 8, by setting the length to the tip of said auxiliary salient pole 8 to be less than the length from the center of the rotary axis of the rotor yoke to the tip of main pole 7.

In the present invention the configurations of the first and second embodiments described previously, can be combined in any way.

Third Embodiment

Figure 19:
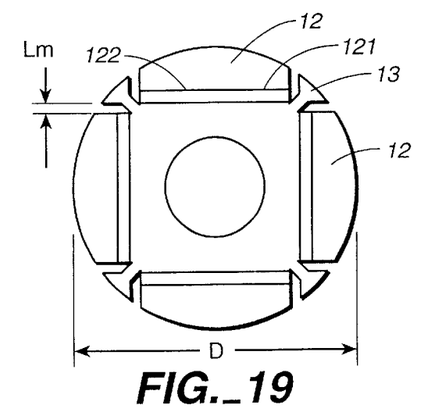
FIG. 19 is a planar diagram that shows another configuration example of a rotor in accordance with a third embodiment of the present invention.

FIG. 19 is a planar diagram that shows another configuration example of the rotor of the DC brushless motor of the present invention. The configurations of the armature and the control apparatus for the DC brushless motor are identical to that shown in the first embodiment described above. Therefore, an explanation of these units is omitted.

As shown in the figure, the rotor for the DC brushless motor is provided with a rotor yoke that has two or more main poles 12 (four main poles in this embodiment) on its periphery. The rotor yoke is composed of laminated steel plates (metal plates).

Slots 121 with a radial-direction size of $L_m$ are formed on each of the main poles 12 in the rotor yoke. A magnetic-field permanent magnet 122 with a thickness approximately equal to $L_m$ (approximately equal to the radial-direction size of slot 121) is embedded in each slot 121. In this case, the radial-direction size $L_m$ of slot 121, the air gap length $L_g$, and the maximum outer diameter D of the rotor are set identically to first embodiment described above.

An auxiliary salient pole 13, made by extruding a part of the rotor yoke, is formed between adjacent main poles 7 on the rotor yoke. An air gap with a specified length (a fixed length) is formed between auxiliary salient pole 13 and an armature (not shown in the figure).

These auxiliary salient poles 13 protrude radially (in the radial direction) from the center of the rotary axis of the rotor yoke. In this case, there is a fixed distance of separation between the tip of auxiliary salient pole 13 and the tip of main pole 12. In other words, the tip of auxiliary salient pole 13 is formed separately and independently from main pole 12.

In this case, coil slot width angle $\theta_2$ of the armature yoke, slot tooth angle $\theta_1$, angle $\gamma$ from the periphery-direction tip of main pole 12 of the rotor (the main-pole tip) to the periphery-direction tip of auxiliary salient pole 13 (the auxiliary-salient-pole tip), and the length from the center of the rotary axis of the rotor yoke to the tip of main pole 12 are set identically to the second embodiment described above.

Thus, the rotor for the DC brushless motor of the present embodiment is a combination of the rotor configuration in the first embodiment and the rotor configuration in the second embodiment that is shown in FIGS. 12–14.

Therefore, the DC brushless motor of the present embodiment offers the advantages of the DC brushless motors of both the first and second embodiments.

Specifically, the DC brushless motor of the present embodiment is capable of attaining a twofold increase or more, in particular a fourfold increase or more, in the range of operating rpm at a continuous-rating current. Further, with an increase in q-axis inductance, the DC brushless motor is capable of increasing its output torque.

It should be noted that a reduction in the thickness of a given magnetic-field permanent magnet reduces the effective magnetic flux. Therefore, to obtain a given output torque using a given armature current level, it is necessary to use a permanent magnet with a high residual magnetic flux density. However, the present embodiment permits an increase in reluctance torque, thus increasing the output torque. This offers the advantage of producing a given level of output torque using a given armature current level without requiring the use of a different main pole permanent magnet.

The application of the DC brushless motor of the present invention includes motors for driving electric scooters, electric automobiles, forklifts, and related mobile units (electric vehicles), as noted above; spindle motors for office automation equipment, disk drives and mini disk drives; servo motors for factory automation; and compressors in air conditioning systems. The application, however, is not limited to these specific items.

The above explanation of the DC brushless motor and the control apparatus of the present invention with reference to illustrated configuration examples should not be construed as limiting the scope of the present invention.

For example, although the embodiments described DC brushless motors having embedded magnet-type rotors, the present invention is equally applicable to DC brushless motors having surface permanent magnet (SPM) rotors.

Similarly, although the above embodiments use magnetic-field permanent magnets with rectangular cross sections, the shape of the magnetic-field permanent magnet of the present invention is not limited to those shown in the figures. The shape of a magnetic-field permanent magnet can be a roof-tile shape (arc shape), for example.

As discussed above, the DC brushless motor and the control apparatus of the present invention are capable of increasing the motor's operating range.

For example, reducing the air gap length $L_g$ and making the magnetic-field permanent magnet thinner (reducing the radial-direction size $L_m$ of the slot to match the thickness of the magnetic-field permanent magnet) makes the motor more sensitive to the armature reaction. The result is a twofold increase or more, in particular a fourfold increase or more, in the operating range within the continuous-rating range of the armature current.

In particular, setting the air gap length $L_g$, the slot radial-direction size $L_m$, and the maximum rotor outer diameter D so that they satisfy the relationship $0<L_m+L_g \leq 2D/51$ produces the effects mentioned above relative to the outer diameter of the rotor.

The present invention can reduce the thickness of the magnet, thus reducing the amount of magnets used and reducing costs.

In situations in which the magnetic-field permanent magnet is polarized when it is inserted into the main pole, the permeance increases during the polarization of the magnetic-field permanent magnet. This facilitates the polarization process and can increase the number of effective magnetic fluxes.

Using the armature coil of an armature as a polarization coil for the magnetic-field permanent magnet eliminates the need for a dedicated polarization yoke and permits the installation of the magnetic-field permanent magnet into the interior of the armature before the magnetic-field permanent magnet is polarized. This makes the installation process immune to the effects of magnetic attraction, thus contributing to productivity improvement.

Forming an auxiliary salient pole, made by extruding a part of the rotor yoke between adjacent main poles on the rotor yoke (forming an auxiliary salient pole in the direction of the q-axis) and providing an air gap of a specified length between the auxiliary salient pole and the armature, increases the q-axis inductance. This increases the reluctance torque as well as the motor torque. Or, for a given torque level, this can reduce the required armature current value, thus resulting in an improved motor efficiency.

Setting the coil slot width angle, $\theta_2$ of the armature yoke; the slot tooth angle, $\theta_1$, of the armature yoke; and the angle $\gamma$ from the tip of the main pole of the rotor to the tip of the auxiliary salient pole, in such a way that they satisfy the relationship $\gamma > \theta_1 + \theta_2$, and in particular the relationship $\gamma = \theta_1 + 2\theta_2$, reduces the pulsation torque and ensures a smooth motor rotation.

Moreover, the control apparatus of the present invention is capable of protecting the magnetic-field permanent magnet from an irreversible demagnetization. This permits a motor operation without causing a degradation in motor performance.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A DC brushless motor comprising:
   an armature; and
   an interior permanent magnet rotor comprising:
   a rotor yoke having at least two main poles arranged on a periphery of said rotor and along a d-axis of said rotor;
   a slot with a radial-direction size of $L_m$ disposed on at least one of said main poles;
   a magnetic-field permanent magnet with an approximate thickness of $L_m$ disposed in said slot, and wherein $L_g$ is defined as a length of an air gap between said rotor and said armature, and wherein a relationship $0<L_m+L_g \leq 2$ mm is satisfied for increasing a maximum rotational speed to attain a speed increase ratio of at least 2, and a q-axis inductance being greater than the d-axis inductance; and
   a protruding portion of said rotor yoke defining an auxiliary salient pole disposed between adjacent ones of said main poles on said rotor yoke and arranged along the q-axis of said rotor, and wherein said auxiliary salient pole and said armature are spaced apart by a predetermined air gap.

2. The DC brushless motor of claim 1, wherein D is defined as a maximum outer diameter of said rotor, and wherein a relationship $0<L_m+L_g \leq 2D/51$ is satisfied.

3. The DC brushless motor of claim 1, wherein said magnetic-field permanent magnet is polarized by an armature coil of said armature.

4. A DC brushless motor of claim 1, wherein a relationship 0.3 mm $\leq L_m+L_g \leq 2$ mm is satisfied for increasing a maximum rotational speed to attain a speed increase ratio of at least 2.

5. The DC brushless motor of claim 1, wherein a relationship 0.3 mm $\leq L_m+L_g \leq 1.3$ mm is satisfied for increasing a maximum rotational speed to attain a speed increase ratio of at least 2.

6. A DC brushless motor comprising:
   an armature; and
   an interior permanent magnet rotor comprising:
   a rotor yoke having at least two main poles arranged on a periphery of said rotor and along a d-axis of said rotor;
   a slot with a radial-direction size of $L_m$ disposed on at least one of said main poles;
   a magnetic-field permanent magnet with an approximate thickness of $L_m$ disposed in said slot, and wherein $L_g$ is defined as a length of an air gap between said rotor and said armature, and wherein D is defined as a maximum outer diameter of said rotor, and wherein the relationship $0<L_m+L_g \leq 2D/51$ is satisfied for increasing a maximum rotational speed to attain a speed increase ratio of at least 2, and a q-axis inductance being greater than the d-axis inductance; and
   a protruding portion of said rotor yoke defining an auxiliary salient pole disposed between adjacent ones of said main poles on said rotor yoke and arranged along the q-axis of said rotor, and wherein said auxiliary salient pole and said armature are spaced apart by a predetermined air gap.

7. The DC brushless motor of claim 6, wherein said magnetic-field permanent magnet is polarized by an armature coil of said armature.

8. The DC brushless motor of claim 6, wherein a relationship 0.3 mm $\leq L_m+L_g \leq 2$ mm is satisfied for increasing a maximum rotational speed to attain a speed increase ratio of at least 2.

9. The DC brushless motor of claim 6, wherein a relationship 0.3 mm $\leq L_m+L_g \leq 1.3$ mm is satisfied for increasing a maximum rotational speed to attain a speed increase ratio of at least 2.

* * * * *